(12) United States Patent
Feuer

(10) Patent No.: US 8,811,787 B2
(45) Date of Patent: Aug. 19, 2014

(54) MULTICORE OPTICAL FIBER WITH REDUCED INTER-CORE CROSSTALK

(75) Inventor: Mark D. Feuer, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 159 days.

(21) Appl. No.: 13/308,167

(22) Filed: Nov. 30, 2011

(65) Prior Publication Data

US 2013/0136404 A1     May 30, 2013

(51) Int. Cl.
    *G02B 6/02* (2006.01)

(52) U.S. Cl.
    USPC .......................................... 385/126; 385/123

(58) Field of Classification Search
    USPC ........................................................ 385/126
    See application file for complete search history.

(56) References Cited

U.S. PATENT DOCUMENTS

| 6,366,347 | B1 | 4/2002 | Boscher | |
| 2010/0054742 | A1 | 3/2010 | Imamura | |
| 2011/0008000 | A1* | 1/2011 | Tokushima | 385/21 |
| 2011/0052129 | A1 | 3/2011 | Sasaoka | |
| 2011/0129190 | A1 | 6/2011 | Fini | |
| 2011/0176776 | A1* | 7/2011 | Imamura | 385/59 |
| 2011/0182557 | A1 | 7/2011 | Hayashi | |
| 2011/0206330 | A1 | 8/2011 | Sasaoka | |
| 2011/0235983 | A1 | 9/2011 | Hayashi | |
| 2011/0249940 | A1 | 10/2011 | Sasaoka | |
| 2011/0274398 | A1 | 11/2011 | Fini | |

OTHER PUBLICATIONS

B. Zhu, T.F. Taunay, M. F. Yan, J. M. Fini, M. Fishteyn, E.M. Monberg, and F.V. Dimarcello, "Seven-core multicore fiber transmissions for passive optical network," Optics Express, vol. 18, pp. 11117-11122 (2010).
M. Koshiba, K. Saitoh, and Y. Kokubun, "Heterogeneous multi-core fibers: proposal and design principle," IEICE Electronics Express, vol. 6, No. 2, 98-103 (2009).
S. Matsuo, K. Takenaga, Y. Arakawa, Y. Sasaki, S. Tanigawa, K. Saitoh and M. Koshiba, "Crosstalk behavior of cores in multi-core fiber under bent condition", IEICE Electronics Express, vol. 8, No. 6, 385-390 (2011).

* cited by examiner

*Primary Examiner* — Ryan Lepisto
(74) *Attorney, Agent, or Firm* — Wolff & Samson, PC

(57) ABSTRACT

Various apparatus and methods for reducing inter-core crosstalk in a multicore optical fiber are disclosed. A multicore optical fiber may include a plurality of cores capable of transmitting optical signals, and a cladding surrounding the cores, the cladding having a heterogeneous refractive index such that the optical signals propagate at different velocities in different ones of the cores. A multicore optical fiber may include a first length including cores having heterogeneous modal velocities and a second length, adjacent to the first length, including cores having heterogeneous modal velocities, and the cores in the first length are aligned with cores in the second length having a different modal velocity. Inter-core cross talk in a multicore optical fiber may also be reduced by transmitting optical signals through cores of a multicore optical fiber and pumping light into the cores to create unequal modal velocities in the cores.

7 Claims, 6 Drawing Sheets

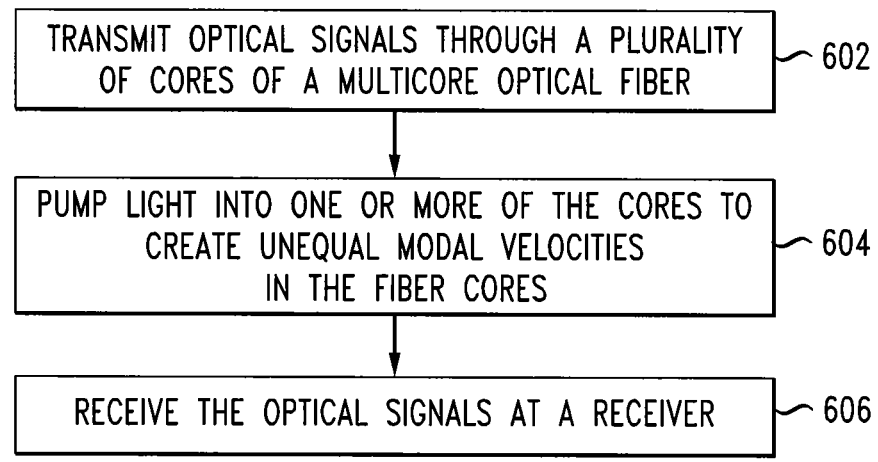
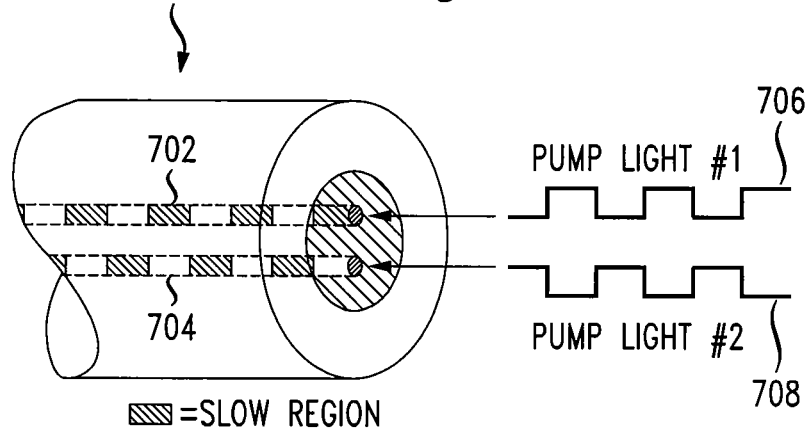

MULTICORE OPTICAL FIBER WITH REDUCED INTER-CORE CROSSTALK

FIELD

The present disclosure relates to transmission of data over optical fibers, and in particular relates to reducing inter-core crosstalk in a multicore optical fiber.

BACKGROUND

In fiber-optic communication system development, increasing the capacity of a fiber transport connection has been a continuing goal. In early optical communications systems virtually all transport was implemented by On-Off Keying (OOK) of a single wavelength, and throughput was upgraded by increasing the symbol rate. This was followed by the introduction of parallelization into the fiber link by carrying many different data streams on separate wavelengths in the same optical fiber using wavelength-division multiplexing (WDM). Currently, wavelength counts in practical deployments have coalesced around 80-96 wavelengths per fiber at 50 GHz spacing, and have stopped increasing rapidly. Other sophisticated modulation formats being used in evolving fiber optic communication systems include Polarization-Multiplexed Quadrature Phase-shift Keying (PM-QPSK) and Orthogonal Frequency-Division Multiplexing (OFDM), which are used to simultaneously achieve data rates higher than the symbol rates and improved spectral efficiency.

A typical optical fiber is made up of concentric cylinders of glass and other materials. FIG. 1 illustrates a conventional optical fiber 100. As illustrated in FIG. 1, at the center of the optical fiber 100 is the core 102, which is a region of high refractive index where the electromagnetic field of the light is concentrated. Surrounding the core 102 is the cladding 104, typically a region of lower refractive index than the core. The diameters and refractive indices of the core 102 and the cladding 104 are chosen so that the light is trapped by the core 102 and will not leak out of the fiber 100 as it propagates lengthwise along the fiber 100. The outermost layer, the coating 106, is applied to provide mechanical and chemical protection of the cladding 104 from scratches, micro-bends, water penetration, etc. The core 102, cladding 104, and coating 106 layer may be all contained in an outer jacket (not shown), which provides additional mechanical strength and protection to the fiber 100. A typical single-mode fiber may have a 9 micron diameter core made of germanium (Ge)-doped silica glass, a 125 micron diameter cladding made of undoped silica glass, and a 250 micron diameter coating of sophisticated polymer compounds. Because of the small core diameter, only a single transverse mode of the light is possible.

Multimode fibers have a much larger core diameter, typically 50 or 63.5 microns, so they can support many transverse modes in the same core. Each transverse mode has a characteristic pattern of light distribution across the core and light is easily coupled from one mode to another, leading to a complex situation when light must be launched from a laser or extracted for a receiver. Although one can conceive of SDM transmission across a conventional multimode fiber, this approach can lead to strong and unstable mode coupling, with energy transferred from mode to mode as the fiber bends or shifts with time. In this case, the transceivers at the endpoints of such links would have to be quite complex and expensive, because the transceivers would be required to sort out the fluctuating energy transfer, which is a very computation-intensive process. For certain coupling coefficients, the ultimate channel capacity may be severely compromised by the mode coupling. In addition, all-optical add/drop of individual modes from such strongly-coupled channels is problematic, requiring optical mode coupling compensators which are not currently available. Further, it is likely that different spatial modes in a multimode fiber will need to have their powers rebalanced along a long transmission path, and this rebalancing will be very difficult when the modes are strongly mixed.

Accordingly, there is a need for multicore fibers in which mode coupling is kept very small over many hundreds of kilometers of transmission distance. A multicore fiber is an optical fiber having multiple separate cores embedded in a cladding region, and each core provides a separate spatial mode for propagating optical signals. Experiments with fibers that have seven separate cores within a cladding region of fairly conventional size (130 um diameter) show that modes can remain fairly well-separated over ~10 km distance, at a wavelength of 1310 nm. However, at 1490 nm, core-to-core crosstalk introduces significant system penalties, and the data suggests that in the C-band near 1550 nm, such penalties would be severe. This core-to-core crosstalk will become still more severe as the number of cores in a multicore fiber increases and the separation between the cores decreases.

BRIEF SUMMARY

The present disclosure provides apparatus and methods for reducing inter-core crosstalk in a multicore optical fiber. According to various embodiments, inter-core crosstalk in a multicore optical fiber may be reduced by transmitting optical data signals in different cores of the multi-core optical fiber with heterogeneous modal velocities.

In one embodiment, a multicore optical fiber includes a plurality of cores, each core capable of transmitting optical signals, and a cladding surrounding the plurality of fiber cores, the cladding having a heterogeneous refractive index such that the optical signals propagate at different velocities in different ones of the plurality of fiber cores.

In another embodiment, a multicore optical fiber includes a first length including fiber cores having heterogeneous modal velocities, and a second length, adjacent to the first length, comprising fiber cores having heterogeneous modal velocities, and the fiber cores in the first length are aligned with fiber cores in the second length having a different modal velocity.

In another embodiment, optical signals are transmitted through a plurality of cores of a multicore optical fiber, and light is pumped into one or more of the plurality of cores to create unequal modal velocities in the plurality of cores.

These and other advantages of the disclosure will be apparent to those of ordinary skill in the art by reference to the following detailed description and the accompanying drawings.

BRIEF DESCRIPTION OF THE DRAWINGS

FIG. 6 illustrates a method for reducing inter-core crosstalk in a multicore fiber according to an embodiment of the present disclosure;

FIG. 7 illustrates propagation of optical signals in cores of an optical fiber being pumped with light according to an embodiment of the present disclosure;

DETAILED DESCRIPTION

Figure 1:
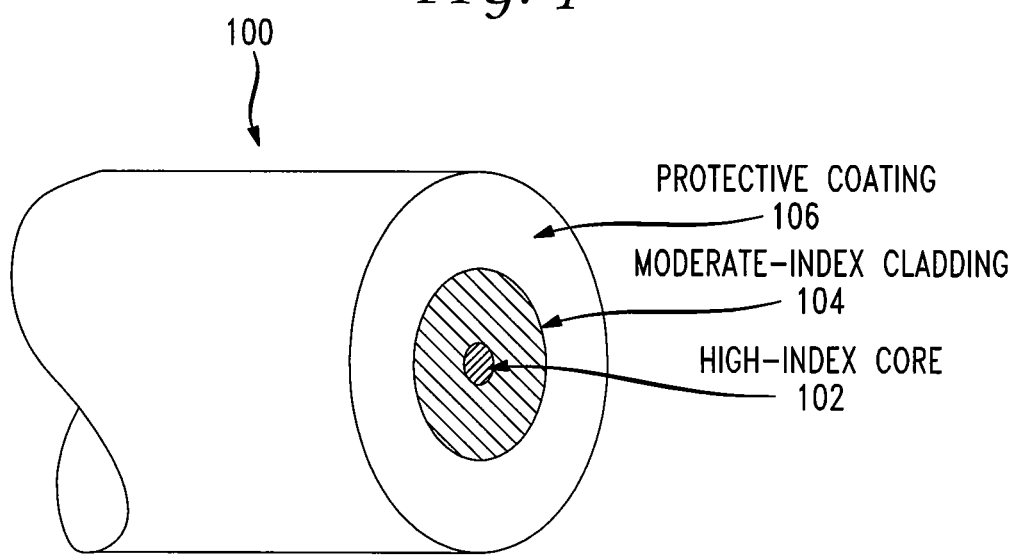
FIG. 1 illustrates a conventional fiber.
Figure 2:
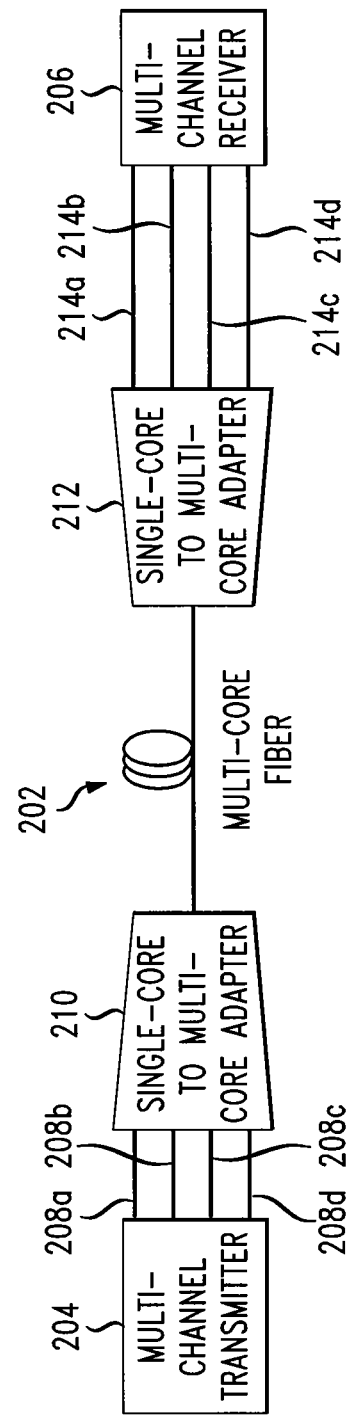
FIG. 2 illustrates a communication system using a multicore fiber.

A multicore fiber is an optical fiber having multiple separate cores embedded in a cladding region, and each core provides a separate spatial mode for propagating optical signals. FIG. 2 illustrates a communication system using a multicore fiber. As illustrated in FIG. 2, a multicore optical fiber 202 is connected between multi-channel transmitter 204 and a multi-channel receiver 206. It is to be understood that the multi-channel transmitter 204 and the multi-channel receiver 206 can both be implemented using a transceiver capable of transmitting and receiving optical signals. The multi-channel transmitter 204 may receive multiple data signals. For example, the data signals may be electrical signals representing streaming data. The multi-channel transmitter 204 can divide each data signal into multiple subsignals, modulate the subsignals of a data signal onto optical carrier waves having different wavelengths, and multiplex the resulting optical subsignals for each data signal onto a respective single-core fiber 208*a*-208*d* using wavelength-division multiplexing (WDM). A single-core to multi-core adapter 210 receives the multiplexed optical signals transmitted through the respective single-core fibers 208*a*-208*d* and transmits the multiplexed optical signal from each single-core fiber 208*a*-208*d* onto a respective core of the multicore fiber 202. A single-core to multi-core adapter 212 located at the receiver 206 end receives the optical signals propagated through the cores of the multicore fiber 202 and transmits the optical signal propagated through each core through a respective single-core fiber 214*a*-214*d* to the multi-channel receiver 206. The multi-channel receiver 206 then de-multiplexes the optical signals and can perform further digital signal processing on the optical signals to retrieve the original data signals. Although shown as separate devices in FIG. 2, it is to be understood that the single-core to multi-core adaptors 210 and 212 may be implemented as part of the same device as the multi-channel transmitter 204 and receiver 206, respectively.

Embodiments of the present disclosure provide methods of fiber design that can achieve reduced core-to-core crosstalk by creating unequal propagation velocities in adjacent cores of a multicore fiber. Conventional multicore fibers typically contain identical fiber cores embedded in a cladding with uniform properties. This conventional approach is a natural extension of the known technology of fiber bundles, as it allows the simplest implementation when core coupling is negligible and is aesthetically pleasing. However, the conventional approach is not effective at minimizing inter-core crosstalk. When cores are identical and embedded in a cladding having a uniform matrix, the optical waves centered on each core will propagate with identical velocities. This means that small amounts of energy transferred from one core to another at different locations along a fiber link will be exactly in phase, thus adding linearly with distance and maximizing the total crosstalk experienced at the end of the fiber link. Even if the inter-core energy transfer per kilometer of fiber is a small as 0.01%, the energy transfer in a 1000-km link will be ~10%, causing unacceptable system penalties.

Embodiments of the present disclosure solve the problem of crosstalk between cores of a multicore fiber, by providing multicore fibers that are designed such that propagation velocities along the different cores are intentionally unequal. In such embodiments, energy transferred from a fast core to a slow core will gradually fall behind the signal in the fast core, so that the energy is out of phase with subsequent transferred energy. This effect is referred to herein as "spatial walkoff". The spatial walkoff effect resulting from the embodiments of the present disclosure occurs between waves of the same wavelength propagating at different spatial locations, and with proper design, the spatial walkoff can apply simultaneously to all of the wavelengths in a WDM signal.

The spatial walkoff can be characterized in terms of the beat length, defined as the propagation distance needed for the slower mode to attain a 180 degree phase difference from the faster mode. For an ideal system, uniform along its length, the inter-core crosstalk will reach its maximum value when the propagation distance reaches one beat length, and then will oscillate between the maximum value and zero for the rest of the optical fiber link length. For the numerical example mentioned above, with 0.01% energy transfer per kilometer, assuming a beat length of 100 m, the maximum energy transfer would be less than 0.001%, leading to a very small system penalty due to inter-core crosstalk.

The beat length may be expressed as:

$$D = \left(\frac{\lambda_0}{2\Delta n}\right),$$

where $\lambda_0$ is the vacuum wavelength and $\Delta n$ is the difference in the modal refractive index between the cores. For a typical wavelength of 1550 nm, a 100 m beat length can be achieved with a modal index difference of just $7.75 \times 10^{-9}$, leading to a corresponding difference in modal velocities between the cores. Each core in a multicore fiber provides a spatial mode, and the modal index is defined as the velocity of light in a vacuum divided by the velocity of light propagating in the specific mode. For most effective suppression of crosstalk, the beat length should be less than the characteristic length over which the mode coupling changes. Therefore, if the mode coupling varies over the length of a few meters, the beat length must be correspondingly smaller. This can be achieved by designing a fiber with a larger modal index difference or larger modal velocity difference between the cores.

According to various embodiments of the present disclosure, a multicore fiber can be designed such that each core in the multicore fiber has a different mode velocity. In some optical fibers with many cores, it may be the case that only neighboring (adjacent) cores suffer from crosstalk. In such cases, according to an embodiment of the present disclosure, non-nearest neighbor cores can share the same mode velocity and the number of distinct core propagation velocities can be reduced below the number of cores. This alternative provides a simplification that can ease manufacture and reduce cost, while still reducing crosstalk in the multicore fiber.

According to various embodiments of the present disclosure, different propagation velocities in different cores of a multicore fiber are achieved using a multicore fiber having multiple cores with heterogeneous properties. That is, different cores of the multicore fiber have different properties that cause different propagation velocities. In one embodiment, different cores of the multicore fiber have different diameters. The different diameters of the cores cause optical signals to propagate at different velocities. It is possible that each core in the multicore fiber has a distinct diameter size. Alternatively, it is possible that adjacent cores have different diameters while non-adjacent cores can have equal diameters. For example, the cores may alternate between a first diameter and second diameter, such that all adjacent cores have different diameters. In cases such as a seven core hexagonal arrangement in which six cores surround a single center core, the six outside cores may alternate between a first and second diameter, while the center core may have a third diameter.

In another embodiment, different cores of the multicore fiber have different refractive indexes. For example, in the manufacturing of such as multicore fiber, different Ge-doping may be used on the different cores to produce a multicore fiber with cores having different refractive indexes. The different refractive indexes of the cores cause optical signals to propagate at different velocities. It is possible that each core in the multicore fiber has a distinct refractive index. Alternatively, it is possible that adjacent cores have different refractive indexes while non-adjacent cores can have equal refractive indexes. For example, the cores may alternate between a first refractive index and second refractive index, such that all adjacent cores have different refractive indexes. In cases such as a seven core hexagonal arrangement in which six cores surround a single center core, the six outside cores may alternate between a first and second refractive index, while the center core may have a third refractive index.

The above described embodiments can be used to achieve unequal modal velocities between multiple cores of a multicore fiber to reduce inter-core crosstalk. However, the cores having unequal modal velocities can result in latency differences or loss differences among the cores. That is, optical signals propagated through a core having a faster modal velocity will arrive at a receiver faster than optical signals propagated through a core having a slower modal velocity. According to an embodiment of the present invention, one way to correct for such differences is to divide a multicore fiber having cores with different modal velocities into a plurality of lengths where cores in each length are matched up with cores in the adjacent length having different modal velocities. Such a multicore fiber can be arranged so that the average modal velocity is the same for each core, while adjacent cores have different modal velocities at any given point along the length of the fiber.

Figure 3:
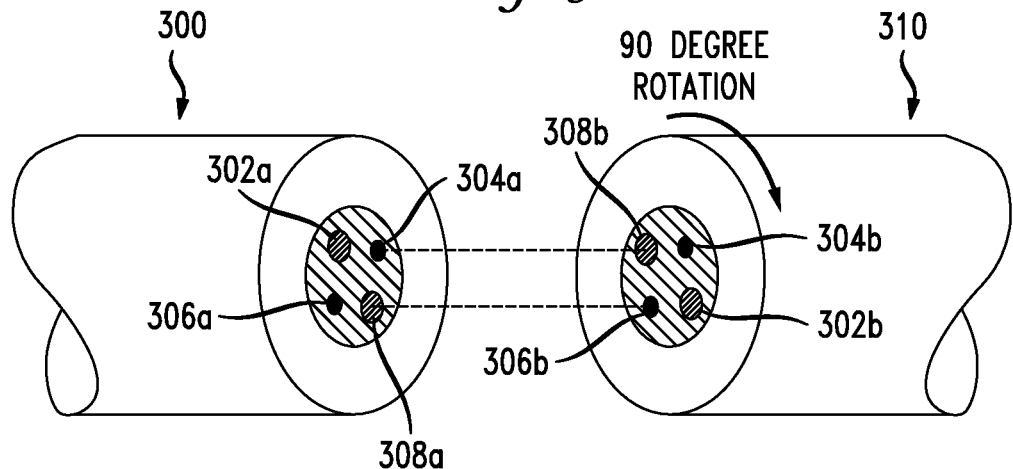
FIG. 3 illustrates a multicore fiber having a first length and a second length rotated with respect to the first length according to an embodiment of the present invention.

For example, a fiber may be divided into the first and second lengths at midspan, and the second length can be rotated with respect to the first length and spliced to the first length so that the slowest core meets the fastest core. FIG. 3 illustrates a multicore fiber having a first length and a second length rotated with respect to the first length according to an embodiment of the present invention. As shown in FIG. 3, a multicore fiber is divided into two lengths 300 and 310. The fiber of FIG. 3 has four cores 302, 304, 306 and 308. The cores are labeled as 302a-308a in the first length 300 and 302b-308b in the second length 310. Cores 302 and 308 have a first diameter and cores 304 and 306 have a second diameter. The diameter of cores 302 and 308 is larger than the diameter of cores 304 and 306, thus causing the modal velocity in cores 302 and 308 to be slower than the modal velocity in cores 304 and 306. The second length 310 is rotated 90 degrees with respect to the first length 300 such that each of the slow cores 302a and 308a in the first length 300 is aligned with a corresponding one of the fast cores 304b and 306b, respectively, in the second length 310; and the fast cores 304a and 306a in the first length 300 are aligned with the slow cores 308b and 302b, respectively, in the second length 310 when the first and second lengths 300 and 310 are spliced. Assuming that the first and second lengths 300 and 310 are spliced at midspan for the fiber, at the end of the span, the modes launched into each of the cores 302, 304, 306, and 308 would experience the same overall propagation delay and loss.

FIG. 3 shows a multicore fiber having different core diameters. It is to be understood that in another embodiment, a similar arrangement can be applied to a multicore fiber having cores with different refractive indexes. Further, such an arrangement for reducing propagation delay and loss in cores having heterogeneous propagation velocities can also be applied to various other embodiments of the disclosure, such as the embodiments of FIGS. 4 and 5 described below. FIG. 3 shows an exemplary arrangement in which two alternating core velocities are used. If cores have more than two different propagation velocities, it is necessary to arrange the cores in such a way that some combination of spliced lengths will equalize the delay/loss of the signals at the end of the completed span. For example, in a hexagonal arrangement in which six cores are arranged around a single center core, the six outer cores can alternate between a first velocity that is large and a second velocity that is small, and the center core can have a third velocity that is half way between the first and second velocities. Thus, when rotated and spliced at midspan, each core having a first velocity in the first length would be aligned with a core having the second velocity in the second length, while the center core would maintain the third velocity for the whole span. According to one embodiment, to avoid the need to custom-splice a fiber at midspan, the splices could be placed at multiple locations along a span, making their exact position less important. Although the example of a "rotated" length of fiber is described above, it is to be understood that "rotation" of a fiber is not a requirement to achieve such an arrangement. All that is required is that the aligning cores in adjacent lengths of fiber have different modal velocities.

According to various other embodiments of the present disclosure, different propagation velocities in different cores of a multicore fiber can be achieved using a multicore fiber having multiple cores embedded in a heterogeneous cladding. In particular, a cladding having a heterogeneous refractive index can be used to create unequal velocities in multiple identical cores of a multicore fiber. Changing the cladding refractive index changes the mode velocity in a core surrounded by the cladding because optical waves are not completely confined within the core. Rather, an optical wave propagated in a core has evanescent fields that extend a significant distance into the cladding material causing the modal velocity of the core to be sensitive to the cladding refractive index.

Figure 4:
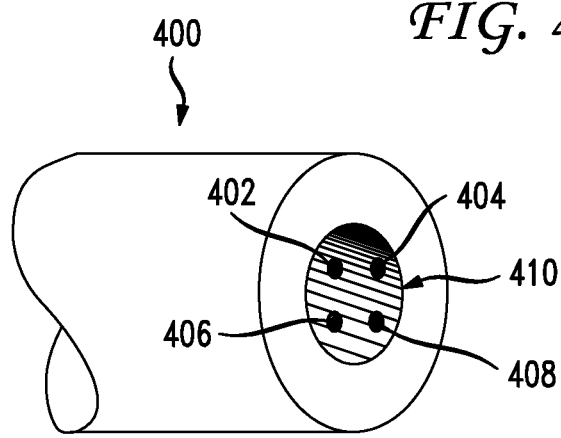
FIG. 4 illustrates a multicore fiber having a heterogeneous cladding according to an embodiment of the present disclosure.

FIG. 4 illustrates a multicore fiber having a heterogeneous cladding according to an embodiment of the present disclosure. As shown in FIG. 4, multicore fiber 400 has multiple cores 402, 404, 406, and 408 embedded in a single cladding region 410 having a gradient of refractive index across a cross-section of the cladding region 410. In FIG. 4, the varying spacing between the lines in the cladding region 410 represent the heterogeneous refractive index of the cladding region 410. The gradient of the refractive index of the cladding region may be a simple linear gradient, as shown in FIG. 4, but the present embodiment is not limited thereto and more complex gradients may be used as well. Such a multicore fiber can be achieved by using a cladding material that has a refractive index gradient across its cross-section.

Figure 5:
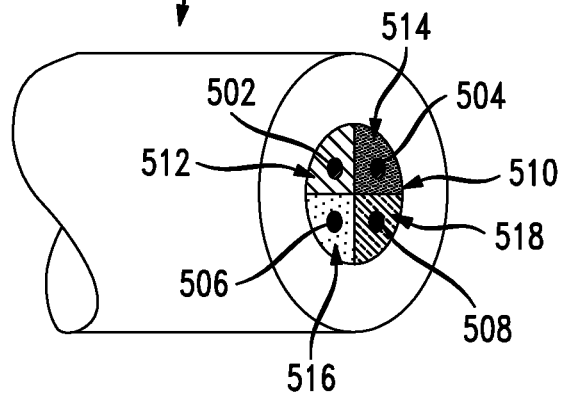
FIG. 5 illustrates a multicore fiber having a heterogeneous cladding according to another embodiment of the present disclosure.

FIG. 5 illustrates a multicore fiber having a heterogeneous cladding according to another embodiment of the present disclosure. As shown in FIG. 5, fiber 500 has multiple fiber cores 502, 504, 506, and 508, and a heterogeneous cladding 510 includes distinct cladding regions 512, 514, 516, and 518 with different refractive indexes. Each of the fiber cores 502, 504, 506, and 508 is embedded in a respective one of the cladding regions 512, 514, 516, and 518. Such a multicore can be manufactured by creating a separate sub-preform for each of the cores, each of the separate sub-preforms having a distinct cladding with a distinct refractive index, assembling a composite preform from separate sub-preforms, then drawing the fiber from the composite preform. Although FIG. 5, illustrates an example with the cladding region surrounding each core having a distinct refractive index, it is also possible that the cladding regions surrounding adjacent cores may have different refractive indexes while the cladding regions surrounding non-adjacent cores may have the same refractive index. For example, the cores can be embedded in separate cladding regions alternating between two refractive indexes. From the well-known four-color map theorem, it can be shown that a maximum of four distinct refractive index values will suffice to assure different refractive indexes among every possible pair of adjacent cladding regions.

Although not shown in FIG. 5, in an alternate embodiment, a fiber having multiple distinct cladding regions may be divided into first and second lengths, with the second length aligned to the first length such that cladding regions in the first length are aligned with cladding regions having a different refractive index in the second length in order to reduce propagation delay and loss, similar to the arrangement described above in connection with FIG. 3.

According to another embodiment of the present disclosure, unequal velocities can be created in cores of a multicore fiber having identical cores and a cladding with a uniform refractive index, as illustrated in FIG. 6. FIG. 6 illustrates a method for reducing inter-core crosstalk in a multicore fiber according to an embodiment of the present disclosure. Referring to FIG. 6, at 602 optical signals are transmitted through a plurality of cores of a multicore fiber. At 604, light is pumped into one or more of the fiber cores to create unequal modal velocities in the fiber cores. At 606, the optical fibers are received at a receiver.

Pumping light into one or more cores (604 of FIG. 6) induces a temporary change in the modal velocity in the one or more cores by relying on a nonlinear effect of the fiber, such as cross-phase modulation, to change the modal velocity of the modes propagated through the cores that are pumped. In this way, by optical pumping, it is possible to create unequal velocities in pumped and unpumped cores to suppress inter-core crosstalk. The pumped light can travel in the same direction as the optical signals or in the opposite direction. The magnitude of the change in modal velocity increases as the intensity of the pumping light increases, so the intensity of the pumping light can be adjusted to achieve the amount of velocity change desired.

In an advantageous embodiment, the velocity-modulation effect created by pumping light into the one or more cores can be combined with Raman pumping, which is used to create gain in the transmission mode to permit the use of longer transmitter-to-receiver distances. However, a potential difficulty with combining Raman and velocity-modulation pumping is that the cores with less velocity modulation (e.g., due to lower pump light intensity) would also receive less Raman gain and might be unable to reach the receiver with a sufficiently low error rate.

According to an advantageous embodiment, to resolve this gain difference, the optical pump wave can be pulsed to create regions of altered velocity (i.e., 'slow regions') alternating with regions of normal velocity along the length of each core. FIG. 7 illustrates propagation of optical signals in cores of an optical fiber being pumped with light according to an embodiment of the present disclosure. As shown in FIG. 7, two adjacent cores 702 and 704 of fiber 700 are pumped with light pulses 706 and 708, respectively. For example, the light pulses 706 and 708 are created by turning on and off respective optical pump waves. Since the temporary change in velocity in a core disappears nearly instantaneously when the optical pump wave is turned off, the slow regions in a core will exactly track the pulses of pump light as they propagate along the fiber. In FIG. 7, the slow regions in cores 702 and 704 are shaded gray, while the normal velocity regions are white. As shown in FIG. 7, by sending pulses 706 and 708 into different cores 702 and 704, respectively, at different times, the slow regions in one core 702 can be controlled to always occur at different locations than the slow regions in an adjacent core 704. Using this staggered timing to pump pulses of light into the cores of a multicore fiber, it is possible to achieve a net Raman gain that is equal for all cores, even while the cores have different modal velocities at virtually all points along the fiber. Such a staggered core pumping strategy also equalizes the signal delays among the cores so that all signals can experience the same net latency.

Figure 8:
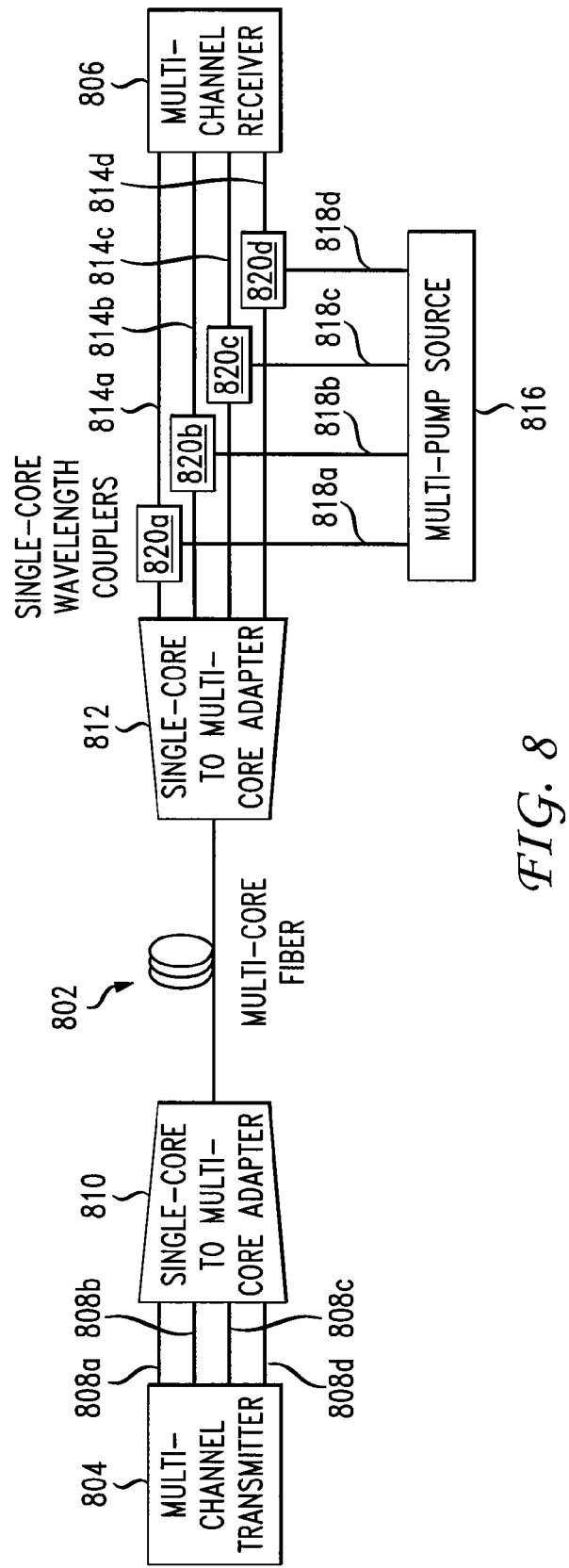
FIG. 8 illustrates a system for transmitting optical signals through a multicore optical fiber with reduced inter-core crosstalk according to an embodiment of the present disclosure.

FIG. 8 illustrates a system for transmitting optical signals through a multicore optical fiber with reduced inter-core crosstalk according to an embodiment of the present disclosure. The multicore fiber 802, multi-channel transmitter 804, multi-channel receiver 806, single-core fibers 808a-808d, single-core to multi-core adapter 810, single-core to multi-core adapter 812, and single-core fibers 814a-814d of FIG. 8 operate similarly to the corresponding components of FIG. 2 described above, except as provided in the subsequent description of FIG. 8. As shown in FIG. 8, a multi-pump source 816 pumps the light onto the cores of the multicore optical fiber 802 from a received end of the fiber 802. In particular, the multi-pump source 816 pumps multiple light waves 818a-818d, each of which are introduced to a respective one of the single-core fibers 814a-814d using a respective single-core wavelength coupler 820a-820d. The single-core to multi-core adapter 812 transmits the light pumped to each one of the single-core fibers 814a-814d to a respective core of the multicore fiber 802. The light waves 818a-818d can be light pulses that are staggered for adjacent cores, as described above and illustrated in FIG. 7. Although illustrated as separate devices in FIG. 8, it is possible that the multi-pump source 816 and multi-channel receiver 806 can be implemented as a single device. According to a possible embodiment, multi-pump source 816 can be controlled by a processor executing stored computer program instruction. Such a processor can be a part of the multi-pump source 816, part of the multi-channel receiver 806, or part of another computer (not shown) that controls the multi-pump source 816.

Figure 9:
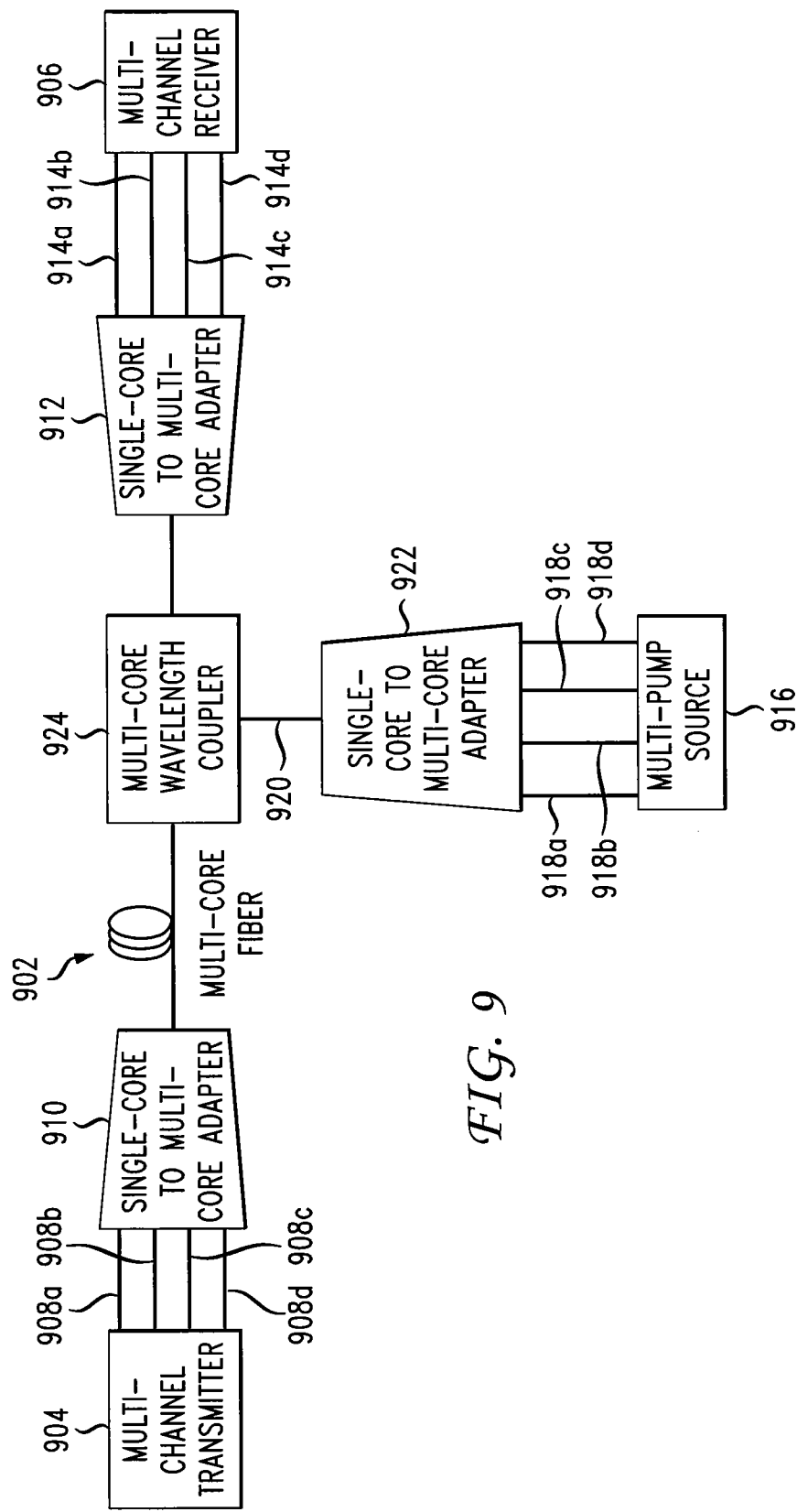
FIG. 9 illustrates a system for transmitting optical signals through a multicore optical fiber with reduced inter-core crosstalk according to an embodiment of the present disclosure.

FIG. 9 illustrates a system for transmitting optical signals through a multicore optical fiber with reduced inter-core crosstalk according to an embodiment of the present disclosure. The multicore fiber 902, multi-channel transmitter 904, multi-channel receiver 906, single-core fibers 908a-908d, single-core to multi-core adapter 910, single-core to multi-core adapter 912, and single-core fibers 914a-914d of FIG. 9 operate similarly to the corresponding components of FIG. 2 described above, except as provided in the subsequent description of FIG. 9. As shown in FIG. 9, a multi-pump source 916 pumps the light onto the cores of the multicore optical fiber 902 from a received end of the fiber 902. In particular, the multi-pump source 916 pumps multiple light waves 918a-918d, each of which are introduced onto a respective core of a multicore optical fiber 920 by a single-core to multi-core adapter 922. The light waves are then introduced onto respective cores of the multicore fiber 902 by a multi-core wavelength coupler 924. The light waves 918a-

918d can be light pulses that are staggered for adjacent cores, as described above and illustrated in FIG. 7. According to a possible embodiment, multi-pump source 916 can be controlled by a processor executing stored computer program instruction. Such a processor can be a part of the multi-pump source 916, part of the multi-channel receiver 906, or part of another computer (not shown) that controls the multi-pump source 916

Although it is not shown in FIG. 8 or FIG. 9, it will be evident to one skilled in the art that the optical pump light used to change the modal velocity can be introduced from the receiving end of the link, from the transmitting of the link, from both ends of the link, or generally, from one or more advantageous locations within the fiber link. Also, other mechanisms for producing gain by optical pumping, such as parametric gain and Brillouin gain, could be used instead of Raman gain, without departing from the spirit of the invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments depicted and described herein are only illustrative of the principles of the present disclosure and that various modifications may be implemented by those skilled in the art without departing from the scope and spirit of the invention. Those skilled in the art could implement various other feature combinations without departing from the scope and spirit of the invention.

The invention claimed is:

1. A multicore optical fiber comprising:
   a plurality of cores each core capable of transmitting optical signals; and
   a cladding surrounding the plurality of fiber cores, wherein the cladding has a heterogeneous refractive index such that the refractive index of the cladding surrounding a first one of the plurality of cores is different from the refractive index of the cladding surrounding a second one of the plurality of cores causing the optical signals to propagate at different velocities in the first and second ones of the plurality of fiber cores.

2. The multicore fiber of claim 1, wherein the cladding has a refractive index gradient across a cross-section of the cladding.

3. The multicore fiber of claim 2, wherein the refractive index gradient across the cross-section of the cladding is a linear gradient.

4. The multicore fiber of claim 1, wherein the cladding comprises:
   a plurality of cladding regions surrounding the plurality of cores, wherein a first one of the plurality of cladding regions surrounding the first one of the plurality of cores has a different refractive index from a second one of the plurality of cladding regions surrounding the second one of the plurality of cores.

5. The multicore fiber of claim 4, wherein each of the plurality of cladding regions has a different refractive index with respect to the other ones of the plurality of cladding regions, and each of the plurality of cladding regions surrounds a respective one of the plurality of cores.

6. The multicore fiber of claim 4, wherein each of the plurality of cladding regions has one of a first, second, third, and fourth refractive index and adjacent ones of the plurality of cores are surrounded by respective ones of the plurality of cladding regions having different refractive indexes.

7. The multicore fiber of claim 1, wherein the plurality of fiber cores each have identical diameters and refractive indexes.

* * * * *